(12) United States Patent
Shim et al.

(10) Patent No.: US 8,761,723 B2
(45) Date of Patent: Jun. 24, 2014

(54) APPARATUS AND METHOD FOR SERVICE MOBILE NODE DECISION BASED ON SERVICE USAGE HISTORY INFORMATION

(75) Inventors: Jae-Chan Shim, Daejeon (KR);
Cho-Rong Yu, Daejeon (KR);
Hwa-Shin Moon, Daejeon (KR);
Hwa-Suk Kim, Daejeon (KR);
Sang-Kwon Kim, Daejeon (KR);
Kee-Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 69 days.

(21) Appl. No.: 13/335,604

(22) Filed: Dec. 22, 2011

(65) Prior Publication Data

US 2012/0164972 A1 Jun. 28, 2012

(30) Foreign Application Priority Data

Dec. 23, 2010 (KR) ........................ 10-2010-0133995

(51) Int. Cl.
*H04W 24/00* (2009.01)
(52) U.S. Cl.
USPC .......................................... 455/405; 455/408
(58) Field of Classification Search
USPC ........... 455/405, 408, 414.1, 418, 432.1, 433, 455/435.2
See application file for complete search history.

(56) References Cited

U.S. PATENT DOCUMENTS

| | | | |
|---|---|---|---|
| 6,574,605 B1 * | 6/2003 | Sanders et al. | 705/7.26 |
| 2010/0011112 A1 | 1/2010 | Song et al. | |
| 2010/0135253 A1 | 6/2010 | Lee et al. | |
| 2010/0250753 A1 | 9/2010 | Song et al. | |
| 2011/0154211 A1 | 6/2011 | Yu et al. | |

FOREIGN PATENT DOCUMENTS

| | | |
|---|---|---|
| KR | 1020090012022 | 2/2009 |
| KR | 1020090076756 | 7/2009 |
| KR | 1020100054025 | 5/2010 |
| KR | 1020100063406 | 6/2010 |
| KR | 1020110070465 | 6/2011 |

* cited by examiner

*Primary Examiner* — Sam Bhattacharya
(74) *Attorney, Agent, or Firm* — Nelson Mullins Riley & Scarborough LLP (57) ABSTRACT

An apparatus for service mobile node decision based on user history information includes: an information management unit configured to manage information of the node and the service and history information of the node and the service; a monitoring unit configured to monitor whether or not the node is usable and monitor the node and the service the user is currently using; and a service mobile node decision unit configured to decide the node which is capable of service mobility according to situations, based on the information of the node and the service, the history information, and the monitored information.

16 Claims, 6 Drawing Sheets

| User | Node | Mobility Support | Available service | Attribute of node | Current location | Current state |
|---|---|---|---|---|---|---|
| Lee, Mong-Ryong | PC | Supported | Broadcasting, messenger, voice call, video call, conference call, ... | CPU performance, memory performance, audio quality, video quality, audio codec, video codec, ... | Office | Usable |
| | Notebook | Unsupported | Broadcasting, messenger, voice call, video call, conference call, ... | CPU performance, memory performance, audio quality, video quality, audio codec, video codec, ... | Office | Unusable |
| | Mobile | Supported | Broadcasting, messenger, voice call, ... | CPU performance, memory performance, audio quality, video quality, audio codec, video codec, ... | Others | Unusable |
| | IP STB | Supported | Broadcasting, messenger, voice call, video call, ... | CPU performance, memory performance, audio quality, video quality, audio codec, video codec, ... | Home | Usable |
| Sung, Chun-hyang | Mobile | Unsupported | Broadcasting, messenger, voice call, ... | CPU performance, memory performance, audio quality, video quality, audio codec, video codec, ... | Others | Usable |
| | IP STB | Supported | Broadcasting, messenger, voice call, video call, ... | CPU performance, memory performance, audio quality, video quality, audio codec, video codec, ... | Home | Unusable |
| | ... | ... | ... | ... | ... | ... |

FIG. 4

| User | Service | Attribute of service | Recommended performance |
|---|---|---|---|
| Lee, Mong-Ryong | Broadcasting | Audio quality, video quality, audio codec, video codec, ⋯ | CPU performance, memory performance, ⋯ |
| | Voice call | Audio quality, video quality, audio codec, video codec, ⋯ | CPU performance, memory performance, ⋯ |
| | Video call | Audio quality, video quality, audio codec, video codec, ⋯ | CPU performance, memory performance, ⋯ |
| | Conference call | Audio quality, video quality, audio codec, video codec, ⋯ | CPU performance, memory performance, ⋯ |
| | Messenger | ⋯ | CPU performance, memory performance, ⋯ |
| | ⋯ | ⋯ | ⋯ |

FIG. 5

| Subscriber | Node | Place | Service 1 | Service 2 |
|---|---|---|---|---|
| Lee, Mong-Ryong | PC1 | Office | Conference call | Messenger |
| | PC2 | Home | Broadcasting | Messenger |
| | Mobile 1 | Office | Voice call | Video call |
| | Mobile 2 | Others | Broadcasting | Messenger |
| | IP STB1 | Home | Broadcasting | Voice call |
| | Notebook | Office | Messenger | Conference call |
| | MID | Others | Broadcasting | Voice call |
| Sung, Chun-hyang | PC | Office | Messenger | Broadcasting |
| | Mobile | Others | Broadcasting | Messenger |
| | IP STB | Home | Broadcasting | Voice call |
| | ... | ... | ... | ... |

FIG. 6

APPARATUS AND METHOD FOR SERVICE MOBILE NODE DECISION BASED ON SERVICE USAGE HISTORY INFORMATION

CROSS-REFERENCE TO RELATED APPLICATIONS

The present application claims priority of Korean Patent Application No. 10-2010-0133995, filed on Dec. 23, 2010, which is incorporated herein by reference in its entirety.

BACKGROUND OF THE INVENTION

1. Field of the Invention

Exemplary embodiments of the present invention relate to an apparatus and method for service mobile node decision; and, more particularly, to an apparatus and method for service mobile node decision based on user's service usage history information when a service user owning a plurality of heterogeneous wired/wireless nodes wants to change a current node, without stopping or disconnecting a service in use, in ALL-IP network environment.

2. Description of Related Art

Networks which can transmit data and voice have been developed and advanced in diverse forms. A single mobile node has received a service through a single technology, but a currently commercialized node can receive several services. Session mobility for ensuring the mobility of such a node means that a currently progressing session is transferred to a network or device to be newly accessed, when a change to a new access network or device occurs while a current multimedia service session is in progress. Service continuity refers to providing a currently used service seamlessly, without session disconnection during the session mobility. The service continuity becomes a very important factor in terms of the guarantee of a quality of service (QoS) which is provided to a user.

In the 3rd Generation Partnership Project (3GPP) which is an organization for 3rd generation standardization of Europe, the standardization for guaranteeing the continuity between access networks among multimedia service continuities was established, and the standardization for guaranteeing the continuity between nodes is now in progress.

Examples include PS-CS continuity considering a case in which a media session is transferred from a circuit-switched (CS) network to a packet-switched (PS) network between a PS network domain and a CS network domain, or its opposite case, PS-PS continuity considering a session mobility within a PS network, a node mobility supporting continuity while moving multimedia components between different nodes of the same user, and a partial session mobility supporting a whole or partial mobility of media components.

Upon mobility between access networks, information of the session mobility target network interface among two or more network interfaces of the node in the same node environment is previously perceived, and a session mobility request including the information is transmitted to an application server (AS). The application server performs a session mobility procedure according to the information of the session mobility target network interface, which is included in the session mobility request. Since the information of the session mobility target network interface, which is included in the session mobility request, is network interface information of the same node environment, it can be considered as information the node has previously known. Thus, it is unnecessary to provide the information to the user prior to the session mobility request.

When an access network changes according to the mobility of the node having multiple network interfaces, a session is transferred to a different network interface of the same node. However, upon session mobility between nodes, a node, which is in progress of a current session among a plurality of nodes used by the same user, previously perceives session mobility target node information, and transmits session mobility request, including the above-mentioned information, to an application server. The user using a plurality of nodes should select a session mobility target node prior to session mobility request, and previously perceive the corresponding node information. However, the session mobility control procedure has been performed, without considering the node having a high session mobility probability among a plurality of nodes.

As one example, location information of a node which is in progress of session may be collected and a node adjacent to the location of the above node may be arranged at a high level. As another example, a newly registered node may be arranged at a high level. As another example, a service mobile node is notified to a user by arranging a node similar to the terminal, which is now in progress of session, at a high level.

However, since the above-mentioned mobile node decision method uses simple basic information, a user may be dissatisfied when service continuity is provided to a user through service mobility. Therefore, when the information of the service mobile node is provided, a service mobile terminal which is most suitable for the service being used among the plurality of nodes is decided and notified. This is the most important information in the session mobility control for the real service movement. In addition, there is a need for techniques which can increase user's service satisfaction.

SUMMARY OF THE INVENTION

An embodiment of the present invention is directed to an apparatus and method for mobile node decision, which can provide a desired service through a user's node anytime anywhere.

Another embodiment of the present invention is directed to an apparatus and method for mobile node decision, which can maximize user's service satisfaction.

Another embodiment of the present invention is directed to an apparatus and method for mobile node decision, which can increase the loyalty of the existing users to thereby prevent their service withdrawal.

Another embodiment of the present invention is desired to an apparatus and method for mobile node decision, which can easily ensure new additional users.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for service mobile node decision based on user history information includes: an information management unit configured to manage information of the node and the service and history information of the node and the service; a monitoring unit configured to monitor whether or not the node is usable and monitor the node and the service the user is currently using; and a service mobile node decision unit configured to decide the node which is capable of service mobility according to situations, based on the information of the node and the service, the history information, and the monitored information.

In accordance with another embodiment of the present invention, a method for service mobile node decision based on user history information includes: detecting a change of a user's location and confirming information on the user's location; confirming information on attribute and state of a user node, information on attributes of services, and history information; and deciding a node capable of using the service by using the confirmed information on the attribute and state of the node, and the confirmed information on the attributes of the services, and the confirmed history information.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Exemplary embodiments of the present invention are directed to technology for deciding a user's service mobile node, when a service mobility is required, depending on a user's location, features of users' own nodes, attributes of services the users use, and users' service usage history information, in an all IP network environment in which users use a plurality of heterogeneous wired/wireless nodes.

In order to decide a service mobile node, a service user prepares and registers history information on a plurality of nodes the user owns, and a service mobile node decision server decides a service mobile node, based on a variety of information managed therein. At this time, a service mobile node which is most suitable for a service being currently provided should be decided using information on attributes of services the user uses, information on attribute of user nodes, and user's service history information.

Hereinafter, embodiments of the present invention will be described in detail with reference to the accompanying drawings.

Figure 1:
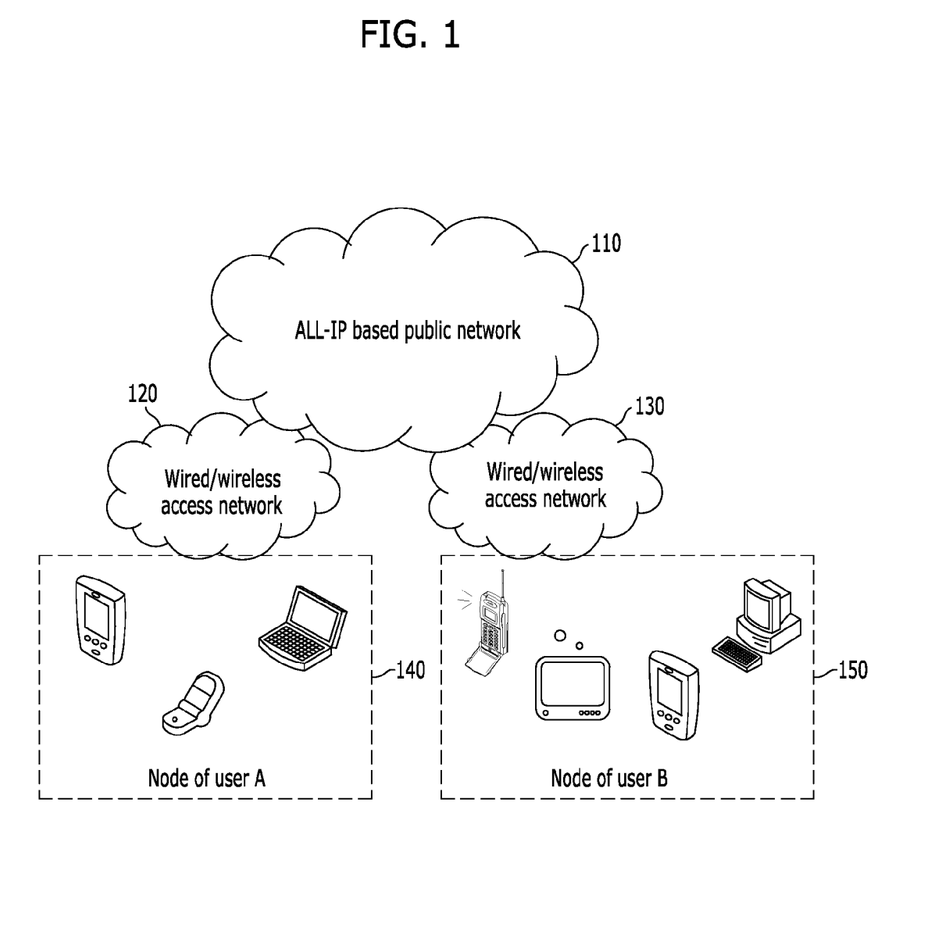
FIG. 1 is a configuration diagram illustrating ALL-IP based network environment in accordance with an embodiment of the present invention.

FIG. 1 is a configuration diagram illustrating ALL-IP based network environment in accordance with an embodiment of the present invention.

Referring to FIG. 1, the ALL-IP based network environment includes an ALL-IP based public network 110, wired/wireless access networks 120 and 130 connected to the public network 110 to allow a user to receive a service, a service mobile node decision server, and a plurality of service nodes 140 and 150 the user uses.

The ALL-IP based public network 110 is a network that supports IP-based communication. A representative example of the ALL-IP based public network 110 is a Broadband convergence Network (BcN). The wired/wireless access networks 120 and 130 are wired networks and wireless networks that support IP communication. Representative examples of the wireless networks include a mobile communication network such as Long Term Evolution (LTE), a Wireless broadband (Wibro) network, and a Wireless Local Area Network (WLAN). Examples of the wired networks include a Passive Optical Network (PON) network, an optical LAN, and an x Digital Subscriber Line (xDSL) network. The subscriber nodes 140 and 150 are various types of nodes that can connect to the wired/wireless networks through the IP communication. Examples of the subscriber nodes 140 and 150 include a mobile phone, a Personal Digital Assistant (PDA), a Portable Multimedia Player (PMP), a Mobile Internet Device (MID), a smart phone, a notebook computer, a netbook computer, a PC, and an IP STB.

Figure 2:
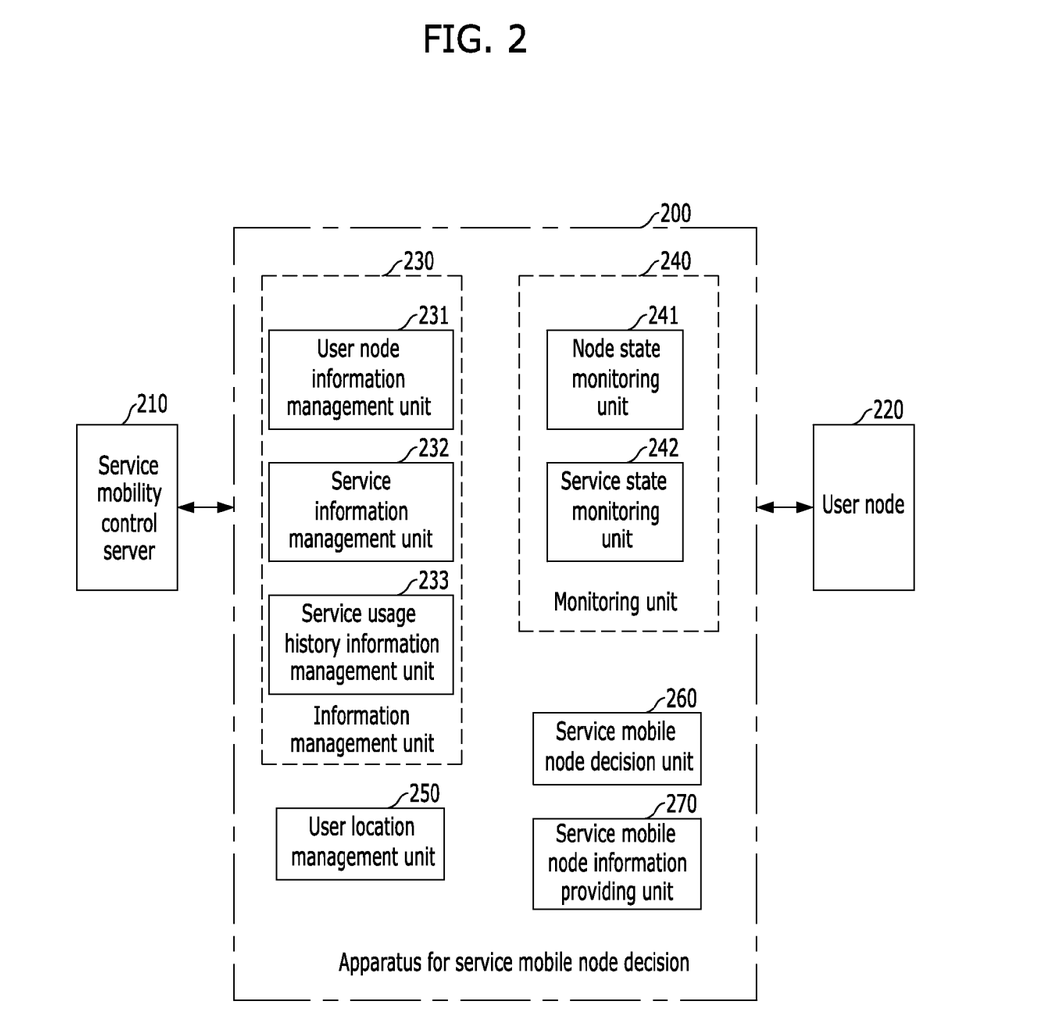
FIG. 2 is a configuration diagram of a service mobile node decision server system in accordance with an embodiment of the present invention.

FIG. 2 is a configuration diagram of a service mobile node decision server system in accordance with an embodiment of the present invention.

Referring to FIG. 2, the service mobile node decision server system includes a service mobility control server 210, a service mobile node decision server 200, and a user node 220. The service mobile node decision server 200 includes an information management unit 230, a monitoring unit 240, a user location management unit 250, a service mobile node decision unit 260, and a service mobile node information providing unit 270. Specifically, the information management unit 230 includes a user node information management unit 231, a service information management unit 232, and a service usage history information management unit 233. The monitoring unit 240 includes a node state monitoring unit 241 and a service state monitoring unit 242.

In the information management unit 230, the user node information management unit 231 stores and manages information on attributes and states of user nodes. The service information management unit 232 stores and manages information on attributes of services subscribed by the user. The service usage history information management unit 233 stores and manages history information of user nodes, that is, information on services the user actually used and information on service usage places. The user location management unit 250 stores and manages information on user's current location where the user uses the service.

In the monitoring unit 240, the node state monitoring unit 241 monitors whether or not the user's nodes are usable. The service state monitoring unit 242 monitors a node and a service which are currently being used by the user.

The service mobility node decision unit 260 decides a service mobile node depending on the situations, based on the above-mentioned information. The service mobility node information providing unit 270 transmits information on the service mobile node to the service mobility control server 210 or the user node 220.

Figure 3:
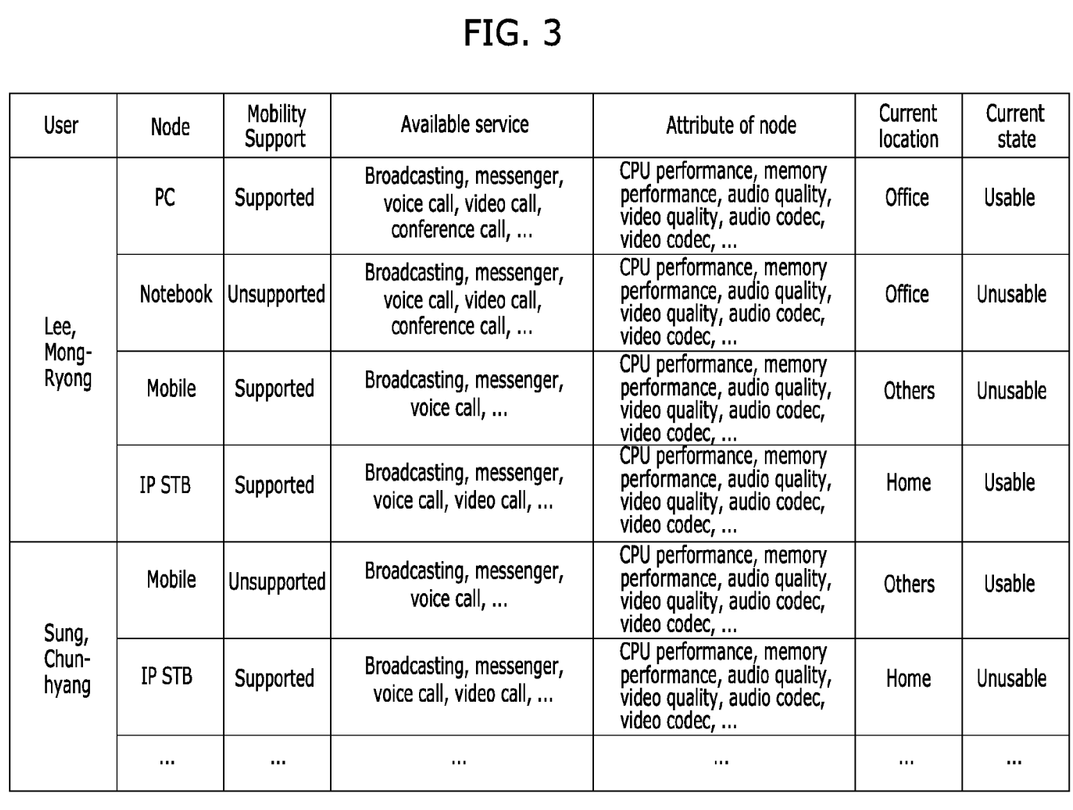
FIG. 3 illustrates the structure of information that is stored and managed by a user node information management unit of an information management unit provided within a service mobile node decision server in accordance with the embodiment of the present invention.

FIG. 3 illustrates the structure of the information that is stored and managed by the user node information management unit of the information management unit provided within the service mobile node decision server in accordance with the embodiment of the present invention.

The user node information management unit 231 of the information management unit 230 provided within the service mobile node decision server 200 stores information on kind of the nodes the subscriber owns, information on whether or not the service mobility is supported in each node, information on available services of each node, information on attribute of each node and information on a current state of each node, that is, information on attribute and state of each node. In particular, the information on the state of each node may be frequently changed depending on the information collected by the node state monitoring unit 241 of the monitoring unit 240.

The kind of the nodes the subscriber owns, the number of the nodes, the kind of the available services of the nodes, and the kind of the information on the attribute of each node and the information on the current location of the nodes, which are contained in the user node information management unit 231, are not limited to the example set forth in FIG. 3.

Figure 4:
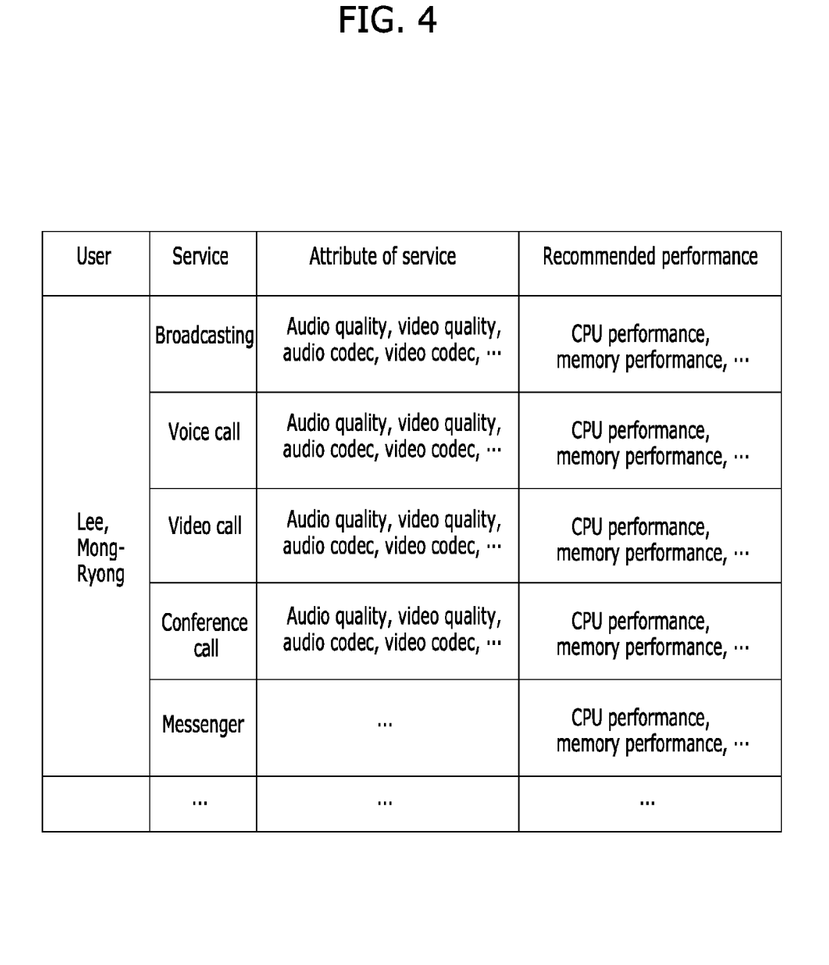
FIG. 4 illustrates the structure of information that is stored and managed by a service information management unit of an information management unit provided within a service mobile node decision server in accordance with the embodiment of the present invention.

FIG. 4 illustrates the structure of the information that is stored and managed by the service information management unit of the information management unit provided within the service mobile node decision server in accordance with the embodiment of the present invention.

The service information management unit 232 of the information management unit 230 provided within the service mobile node decision server 200 stores information on attributes of services subscribed and used by each user, and information on recommended performance required in order for the node to receive the corresponding service. In order to store and manage the service information, the service information management unit 232 manages the information on attributes of services, that is, the information on the services subscribed by each user, the attributes of the services, and the recommended performance for supporting the services.

The kinds of the subscribed services, the kinds of the information on the attributes of the subscribed services, and the kinds of the information on the recommended performance for the subscribed services are not limited to the structure of FIG. 4.

Figure 5:
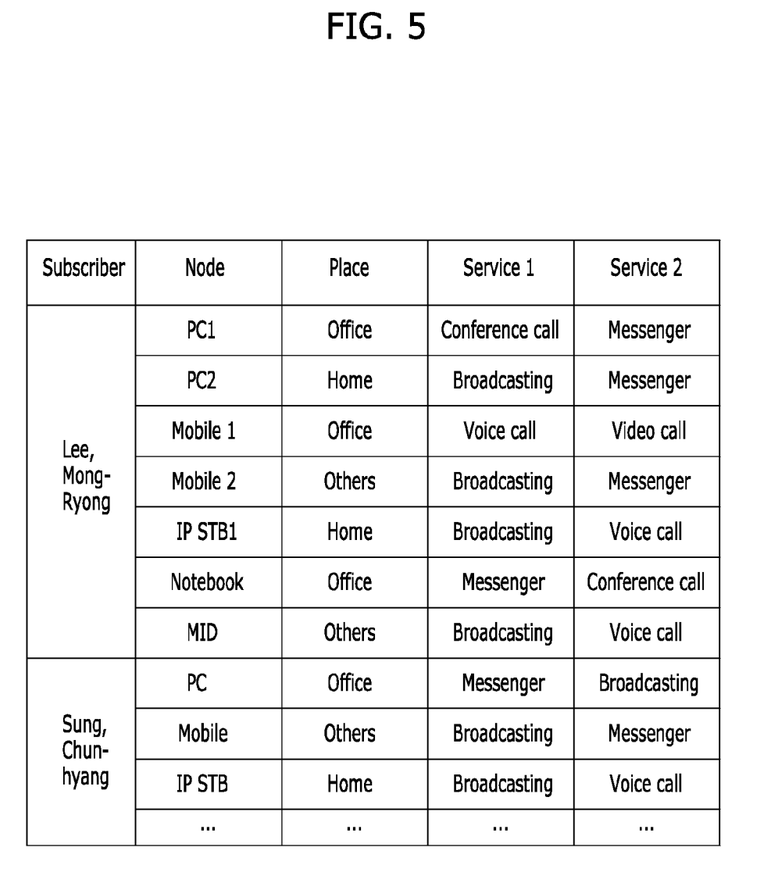
FIG. 5 illustrates the structure of information that is stored and managed by a service usage history information management unit of an information management unit provided within a service mobile node decision server in accordance with the embodiment of the present invention.

FIG. 5 illustrates the structure of the information that is stored and managed by the service usage history information management unit of the information management unit provided within the service mobile node decision server in accordance with the embodiment of the present invention.

The service usage history information management unit 233 of the information management unit 230 provided within the service mobile node decision server 200 stores and manages information on main usage services, service usage places, and service usage time, on the basis of the nodes the subscriber owns. The nodes owned by the subscribers, the places of the nodes, the usage services of the nodes, and the usage time of the nodes are referred to as history information. The history information may be frequently modified according to information collected periodically or at each service usage event at the service state monitoring unit 242.

The history information on the kinds of the nodes owned by the subscriber, the number of the nodes, the service usage places of the nodes, and the kinds of the usage services of the terminals are not limited to the structure of FIG. 5.

Figure 6:
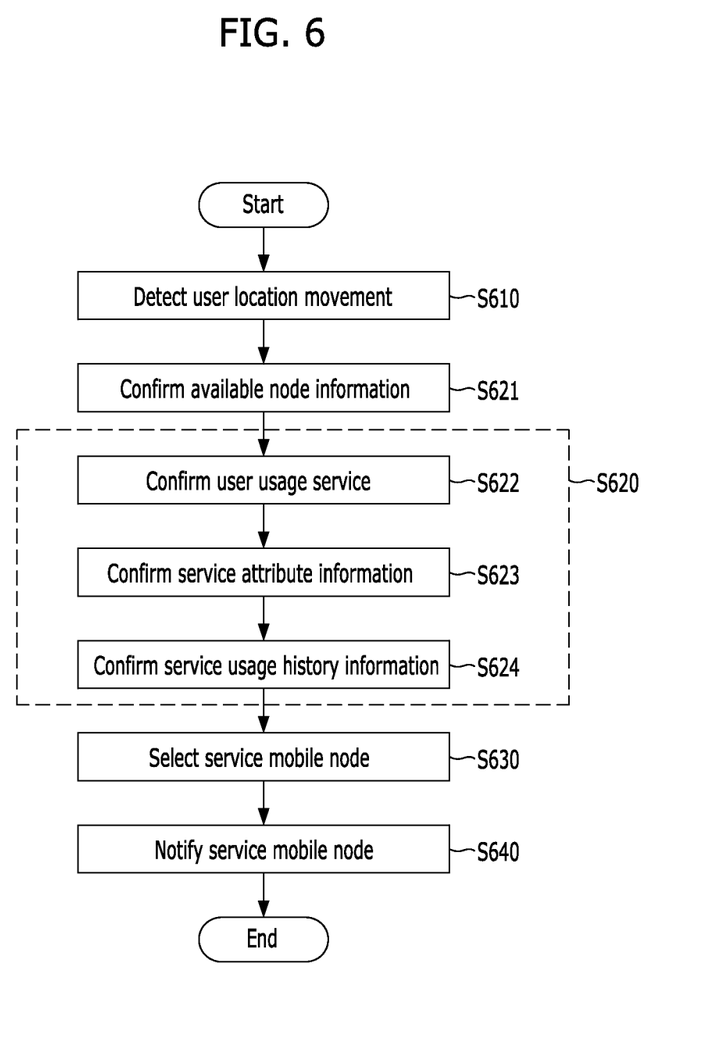
FIG. 6 is a flowchart illustrating a method in which a service mobile node decision server decides a service mobile node based on a user's service usage history information, in accordance with an embodiment of the present invention.

FIG. 6 is a flowchart illustrating a method in which a service mobile node decision server decides a service mobile node based on a user's service usage history information, in accordance with an embodiment of the present invention.

Referring to FIG. 6, the method includes a user location movement detecting step S610, a user node and service information confirming step S620, a service mobile node selecting step S630, and a service mobile node notifying step S640. In addition, the user node and service information confirming step S620 includes an available node information confirming step S621, a user usage service confirming step S622, a service attribute information confirming step S623, and a service usage history information confirming step S624.

The method in which the service mobile node decision server decides the service mobile node based on the user's service usage history information, in accordance with an embodiment of the present invention, will be described below in detail with reference to FIG. 6. At the user location movement detecting step S610, the user location management unit 250 detects the user location change and confirms the information on the user's current location.

At the user node and service information confirming step S620, the information management unit 230 and the monitoring unit 240 confirm the user node and service information. The operation of the information management unit 230 will be described below. At the available node information confirming step S621, the user node information management unit 231 searches the node placed at the same location as the user's current location among the user's nodes. Among the searched nodes, the nodes which support the service mobility and are in an available state are selected.

At the user usage service confirming step S622, the service state monitoring unit 242 confirms the service that the user who moved is currently using. At the service attribute information confirming step S623, the service information management unit 232 confirms the information on the user's current usage services when the user's current usage service is conformed.

At the user usage history information confirming step S624, the service usage history information management unit 233 confirms the service and the node which the user has frequently used in the actual service usage, based on the user's current information confirmed at the step S610 and the user's current usage service information confirmed at the step S623.

At the service mobility node selecting step S630, the service mobile node decision unit 260 decides available nodes suitable for a service the current subscriber is being used, by comparing the available service of the usable nodes and the node attribute information confirmed at the available node confirming step S621 with the attribute information and the recommended performance information of the corresponding service confirmed at the service attribute information confirming step S623. In addition, when the user's location is changed, the node frequently using the corresponding service is decided among the finally selected available nodes, based on the previous service usage history information confirmed at the service usage history information confirming step S624.

At the service mobile node notifying step S640, the service mobile node information providing unit 270 confirms the user identification item among the user history information in the service mobile node information finally decided through the steps S610 to S630, and transmits the confirmed item as follows.

If the user identification item is unnecessary, in a case in which the service mobility is performed to a user's other node according to the change in the user's location, the mobile node information is transmitted to the service mobility control server performing the service mobility between the user nodes, without conforming the users. If the user identification item is necessary, the mobile node information is transmitted to the node with which the user conducts the service mobility, because the user's agreement should be sought before the service mobility between the user nodes. At this time, when a plurality of service mobile nodes are confirmed when at the several service mobile node decision step, instead of transmitting one service mobile node information, several pieces of mobile node information may be transmitted according to the user's request.

In the exemplary embodiments of the present invention, the service mobile node, which is most basic in the service mobility between the nodes, is decided based on the user service usage history information. Thus, the user can receive the desired service through his or her own node anytime anywhere, thereby maximizing the user's service satisfaction. In addition, service providers can increase the loyalty of the existing users to thereby prevent their service withdrawal. Moreover, it is possible to easily obtain new additional users.

While the present invention has been described with respect to the specific embodiments, it will be apparent to those skilled in the art that various changes and modifications may be made without departing from the spirit and scope of the invention as defined in the following claims.

What is claimed is:

1. An apparatus for deciding a node of a mobile network to provide a service to a user based on user history information, the apparatus comprising:
    an information management unit configured to manage information of nodes and services and history information of the nodes and the services;
    a monitoring unit configured to monitor whether the nodes are usable and monitor the nodes and a current service that the user is currently using;
    a service mobile node decision unit configured to decide a node which is capable of service mobility that provides continuity of the current service according to situations, among user nodes that are owned by the user, based on the information of the nodes and the services, the history information, and monitored information; and
    a user location management unit configured to manage location information of the user.

2. The apparatus of claim 1, further comprising a service mobile node information providing unit configured to transmit information on the decided node to a service mobility control server performing the service mobility between the user nodes.

3. The apparatus of claim 1, wherein the information management unit comprises:
    a user node information management unit configured to store and manage attribute and state information of each of the user nodes;
    a service information management unit configured to store and manage attribute information of services currently subscribed by the users; and
    a service usage history information management unit configured to store and manage history information of the nodes subscribed by the users.

4. The apparatus of claim 1, wherein the monitoring unit comprises:
    a node state monitoring unit configured to monitor whether each of the nodes is usable; and
    a service state monitoring unit configured to monitor the node and the current service the user is currently using.

5. The apparatus of claim 3, wherein the attribute and state information of the node comprises information on kind of the nodes, information on whether the service mobility is supported by the node, information on available services of each the node, information on attribute of the node, and information on state of the node.

6. The apparatus of claim 5, wherein the information on the state of the node is frequently modified according to information collected at the node state monitoring unit.

7. The apparatus of claim 3, wherein the information on the attribute of the service comprises information on the services subscribed by the user, information on attributes of the services, and information on recommended performance for supporting the services.

8. The apparatus of claim 3, wherein the history information comprises kind of the nodes, the number of the nodes, the service usage places of each of the nodes, and kind of usage services of each of the nodes.

9. The apparatus of claim 3, wherein the history information is frequently modified according to information collected periodically or at each service usage event at the service state monitoring unit.

10. A method for deciding a node of a mobile network to provide a service to a user based on user history information, the method comprising:
    detecting a change of a location of the user and confirming information on the location of the user;
    confirming information on attribute and state of nodes, information on attributes of services, and history information; and
    deciding a node capable of service mobility that provides continuity of a current service that the user is currently using, among user nodes that are owned by the user, by using confirmed information on the attribute and state of the node, and confirmed information on the attributes of the services, and confirmed history information.

11. The method of claim 10, wherein, if user identification among the history information is unnecessary, it is necessary to perform the service mobility to a user's other nodes according to a change in the location of the user, and to transmit information on the decided node to a service mobility control server performing the service mobility between the user nodes, without user identification.

12. The method of claim 10, wherein, if user identification among the history information is necessary, information on the nodes is transmitted to the node with which the user conducts the service mobility, because an agreement of the user should be sought before performing service mobility between the user nodes.

13. The method of claim 10, wherein said confirming information on attribute and state of nodes, information on attributes of services, and history information comprises:
    searching nodes placed at the same location as current location of the user by using the confirmed information on the location of the user, and selecting nodes supporting the service mobility and being in a usable state among the searched nodes;
    confirming a current service which the user who moved is currently using;

confirming information on attribute of the current service of the user when the current service of the user is confirmed; and confirming a service and a node which the user has frequently used in a real service usage, based on the confirmed information on the current location of the user and the confirmed information on the current service of the user.

14. The method of claim 10, wherein the information on attribute and state of the node comprises information on kind of the nodes, information on whether the service mobility is supported by the node, information on available services of the node, information on attribute of the node, and information on state of the node.

15. The method of claim 10, wherein the information on the attribute of the services comprises information on services subscribed by the user, information on attributes of the services, and information on recommended performance for supporting the services.

16. The method of claim 10, wherein the history information comprises kind of the nodes, the number of the nodes, the service usage places of each of the nodes, and kind of usage services of each of the nodes.

* * * * *